US006958677B1

(12) United States Patent
Carter

(10) Patent No.: US 6,958,677 B1
(45) Date of Patent: Oct. 25, 2005

(54) OBJECT LOCATION MONITORING SYSTEM

(75) Inventor: Scott J. Carter, Seal Beach, CA (US)

(73) Assignee: GE Medical Systems Information Technologies, Inc., Milwaukee, WI (US)

( * ) Notice: Subject to any disclaimer, the term of this patent is extended or adjusted under 35 U.S.C. 154(b) by 477 days.

(21) Appl. No.: 09/824,921

(22) Filed: Apr. 2, 2001

Related U.S. Application Data

(60) Provisional application No. 60/193,650, filed on Mar. 31, 2000.

(51) Int. Cl.[7] ............................................. H04Q 5/22
(52) U.S. Cl. ............................. 340/10.1; 340/310.06; 340/3.21; 340/3.41; 340/10.4; 340/10.3; 340/825.72; 340/825.69; 340/505; 340/572.1; 340/10.2; 340/10.31; 340/10.5
(58) Field of Search ................................ 340/10.1, 3.2, 340/310.01, 310.04, 310.06, 3.21, 3.41, 5.61, 340/5.64, 10.2

(56) References Cited

U.S. PATENT DOCUMENTS

| 4,434,510 | A | * | 2/1984 | Lemelson ................... 455/603 |
| 4,882,664 | A | * | 11/1989 | Pennington ................... 363/41 |
| 5,119,104 | A | | 6/1992 | Heller |
| 5,251,021 | A | * | 10/1993 | Parulski et al. ............. 358/500 |
| 5,365,516 | A | | 11/1994 | Jandrell |
| 5,396,224 | A | | 3/1995 | Dukes et al. |
| 5,425,032 | A | * | 6/1995 | Shloss et al. ............... 370/346 |
| 5,446,701 | A | | 8/1995 | Utke et al. |
| 5,453,747 | A | * | 9/1995 | D'Hont et al. ............. 342/432 |
| 5,650,778 | A | * | 7/1997 | Urbas et al. ........... 340/870.31 |
| 5,838,226 | A | * | 11/1998 | Houggy et al. ........ 340/310.01 |
| 5,944,659 | A | | 8/1999 | Flach et al. |
| 6,058,374 | A | * | 5/2000 | Guthrie et al. ................ 705/28 |
| 6,104,295 | A | | 8/2000 | Gaisser et al. |
| 6,122,329 | A | * | 9/2000 | Zai et al. ..................... 375/329 |
| 6,150,921 | A | | 11/2000 | Werb et al. |
| 6,154,139 | A | | 11/2000 | Heller |
| 6,222,440 | B1 | | 4/2001 | Heller |
| 6,377,203 | B1 | * | 4/2002 | Doany ......................... 342/44 |

(Continued)

FOREIGN PATENT DOCUMENTS

WO    WO 98/16849    4/1998

(Continued)

OTHER PUBLICATIONS

A. Ward, A. Jones and A. Hopper, "A New Location Technique for the Active Office," IEEE Personal Communications, vol. 4, No. 5, pp. 42-47, dated Oct. 1997.

(Continued)

Primary Examiner—Brian Zimmerman
Assistant Examiner—Vernal Brown
(74) Attorney, Agent, or Firm—Andrus, Sceales, Starke & Sawall, LLP

(57) ABSTRACT

An object location monitoring system includes beacons that are spatially distributed throughout an area to be monitored. The beacons transmit interrogation signals that are received and echoed by transponders that attach to moveable objects. Each beacon retransmits its interrogation signal, and any transponder response thereto, to a receiver that measures a time difference between the two signals. This time difference reflects the signal propagation time, and thus the distance, between the beacon and the transponder. One such receiver preferably analyzes the retransmitted signals of multiple (e.g., 50 to 100) beacons. A triangulation method is used to determine the location of each transponder based on the transponder's distances from a set of beacons. In one embodiment, the transponders are provided as or within disposable ID bracelets worn by patients, and are used to track the locations of the patients within a hospital.

33 Claims, 13 Drawing Sheets

U.S. PATENT DOCUMENTS 6,407,695 B1 * 6/2002 Stierlin et al. ............... 342/42
6,480,699 B1 * 11/2002 Lovoi .......................... 455/41
6,529,164 B1   3/2003 Carter
6,564,807 B1 * 5/2003 Schulman et al. .......... 128/899

FOREIGN PATENT DOCUMENTS

| WO | WO 99/67737 | 12/1999 |
|---|---|---|
| WO | WO 00/52498 | 9/2000 |
| WO | WO 01/06401 A1 | 1/2001 |
| WO | WO 01/15070 A2 | 3/2001 |

OTHER PUBLICATIONS

R. Want, A. Hopper, V. Falcao and J. Gibbons, "The Active Badge Location System," ACM Transactions on Information Systems, vol. 10, No. 1, pp. 91-102, dated Jan. 1992.

* cited by examiner

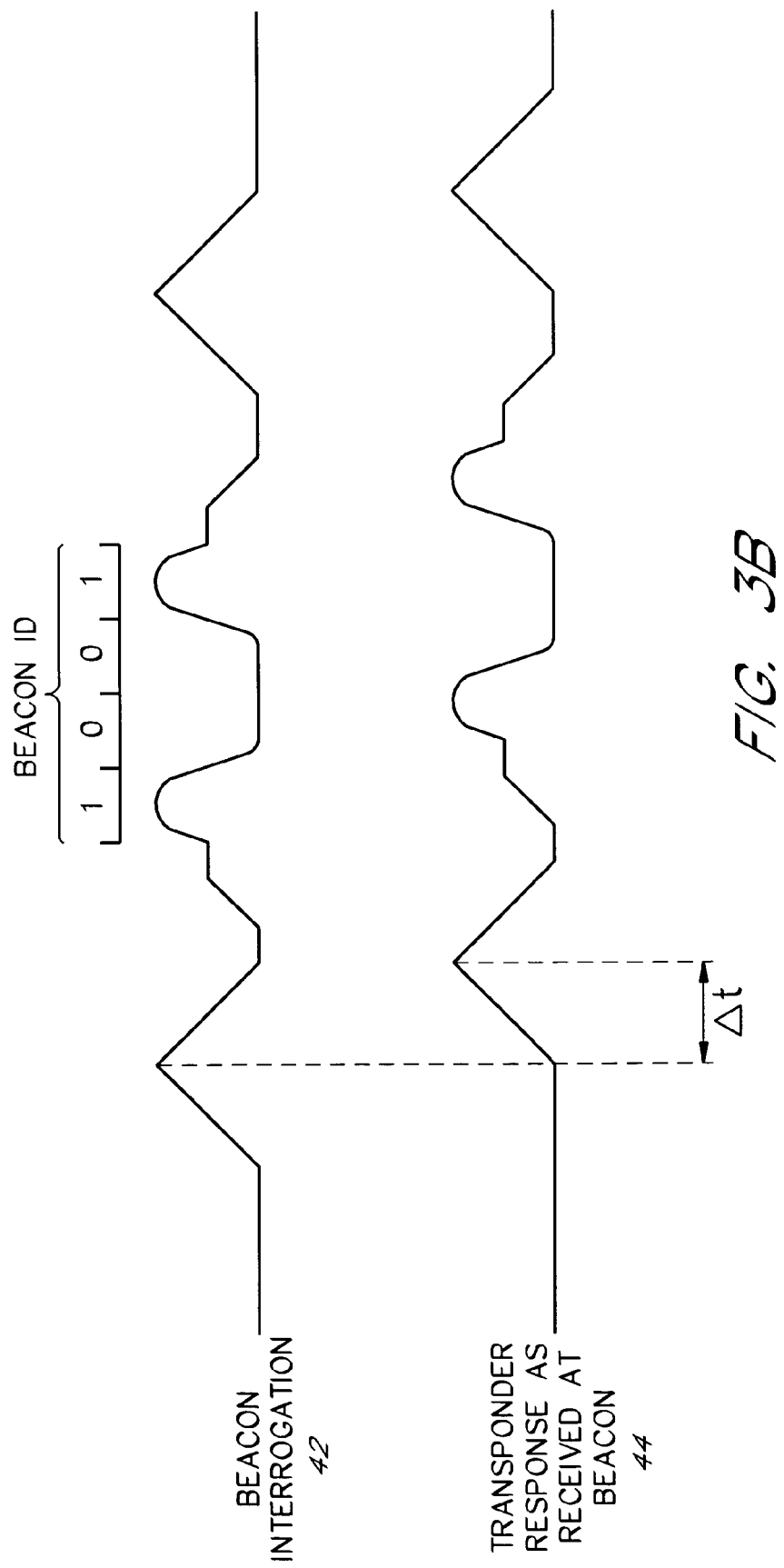

OBJECT LOCATION MONITORING SYSTEM

RELATED APPLICATIONS

This application claims the benefit of Provisional Appl. No. 60/193,650, filed Mar. 31, 2000, the disclosure of which is hereby incorporated by reference.

BACKGROUND

1. Field of the Invention

The present invention generally relates to object location monitoring systems for use in and around buildings. More specifically, the present invention relates to systems that use beacons and object-attached transponders to track the locations of objects.

2. Description of the Related Art

Various approaches have been proposed for monitoring the locations of objects within an area. One such approach uses radio frequency (RF) transmitters or tags, attached to the objects to be tracked, and an array of receivers for receiving tag transmissions throughout a tracking area. The signal strengths of the received tag transmissions may then be used to determine a tag's distance from the receivers. One problem with this approach is that it is not well suited for monitoring the locations of objects within a building having multiple rooms. In such an environment, the unpredictable attenuation of transmissions passing through walls and other structures, and the effects of multi-path distortion, make signal strength only marginally useful as a parameter for determining distance.

One solution to this problem, proposed in U.S. Pat. No. 5,119,104 to Heller, involves accurately measuring the time of arrival of the tag transmission at each of multiple receivers. This time of arrival data is then used in combination to determine the location of the tag. A significant problem with this approach is that a high degree of synchronization is required between the receivers to produce accurate results. As a result, such a system tends to be difficult and expensive to implement.

SUMMARY OF THE INVENTION

An object location monitoring system includes beacons that are spatially distributed throughout an area to be monitored, and transponders that attach to the objects to be monitored. Each beacon intermittently transmits a radio frequency or ultrasonic interrogation signal. Transponders that are in range of the beacon receive and echo the interrogation signal. Each beacon retransmits its interrogation signal, and any transponder response thereto (as received by the beacon), to a receiver that measures a time difference between the two signals. This time difference reflects the signal propagation time, and thus the distance, between the beacon and the transponder. One such receiver preferably analyzes the retransmitted signals of multiple (e.g., 50 to 100) beacons. A triangulation method is used to determine the location of each transponder based on the transponder's distances from a set of beacons.

The beacons and transponders are preferably assigned to timeslots of a TDMA frame so that nearby beacons and transponders do not interfere. In one embodiment, the beacons become synchronized with each other by monitoring the phase of the AC power signal on the building's power lines. This may be accomplished either directly or by monitoring the flicker of the building's lighting. Only coarse synchronization of the beacons is needed in comparison to prior approaches. The transponders preferably become synchronized to the beacons by monitoring a periodic synchronization sequence transmitted by one or more of the beacons.

Some of all of the transponders may be provided as or within disposable ID bracelets or wristbands worn by patients in a hospital. In one embodiment, the transponder's electronics are housed within a reusable module that inserts into a disposable wristband. The wristband preferably houses a battery used to power the transponder's circuitry. Each wristband may also include an ID which is adapted to be read or sensed by the transponder module. This ID preferably specifies the timeslot assignment to be used by the transponder module.

BRIEF DESCRIPTION OF THE DRAWINGS

These and other features will now be described with reference to the following drawings of specific embodiments of the invention:

FIG. 3B illustrates the beacon ID portion of the interrogation waveform in greater detail according to one embodiment.

Throughout the drawings, reference numbers will be re-used to indicate elements that are the same or functionally similar.

DETAILED DESCRIPTION OF THE PREFERRED EMBODIMENTS

The specific embodiments described below are intended to illustrate, and not limit, the invention. The scope of the invention is defined by the appended claims. For convenience, the description of the preferred embodiments is arranged within the following sections:

I. Overview (FIGS. 1 and 2A)

Figure 2A:
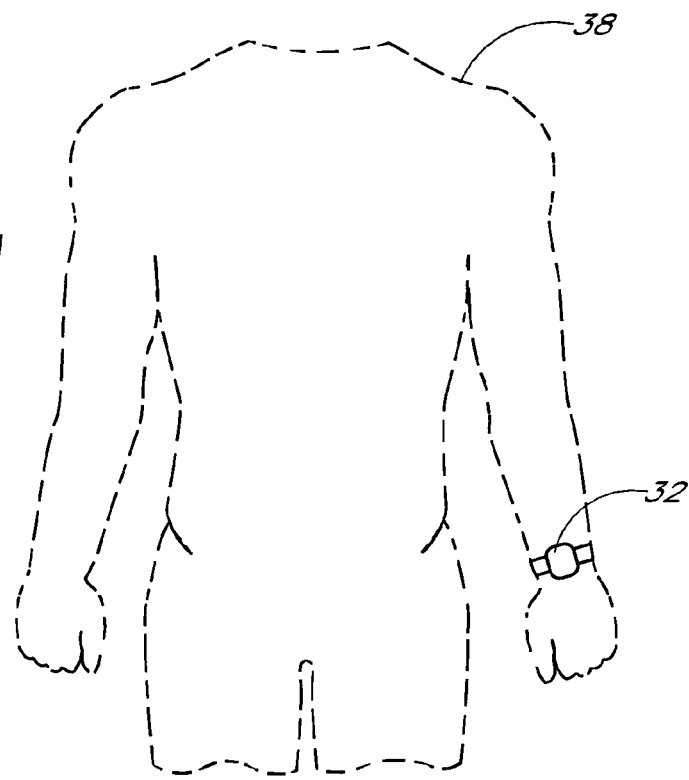
FIG. 2A shows how a transponder may be worn as a wristband or bracelet by a patient or other individual to be tracked.
Figure 2B:
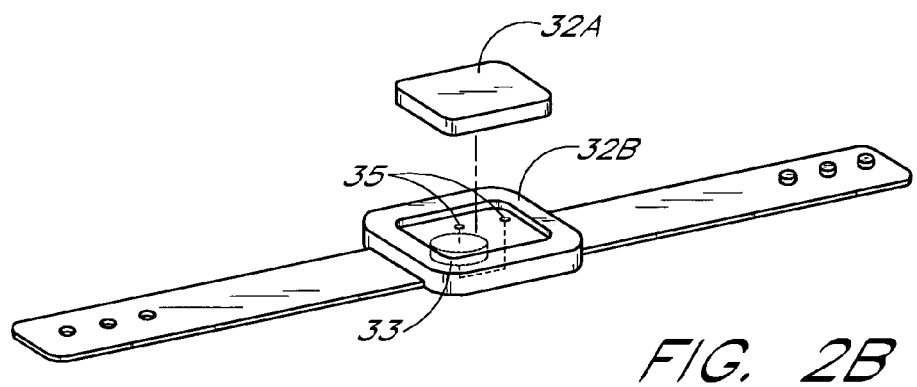
FIG. 2B illustrates a transponder design in which the transponder electronics are provided as a reusable module that plugs into a disposable ID wristband or bracelet.
Figure 2C:
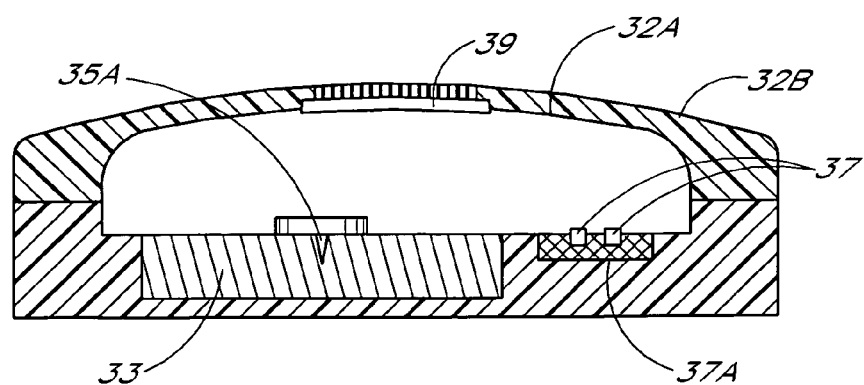
FIG. 2C illustrates an example implementation of the wristband design shown in FIG. 2B.

II. Disposable Bracelet Transponder Design (FIGS. 2B and 2C)

III. Waveform and Timing Diagrams (FIGS. 3–6)
IV. Integration of Receivers with Network Access Points (FIG. 7)
V. Example Beacon Circuit (FIGS. 8 and 9)
VI. Example Transponder Circuit (FIG. 10)
VII. Example Receiver Circuit (FIG. 11)
VIII. Determination of Transponder Locations (FIG. 12)
IX. Ultrasonic Embodiments
X. Dithering of Beacon Timeslots to Avoid Lockstep Interference
XI. Use of Building Power Lines to Convey Beacon Retransmissions I. Overview (FIGS. 1 and 2A)

Figure 1:
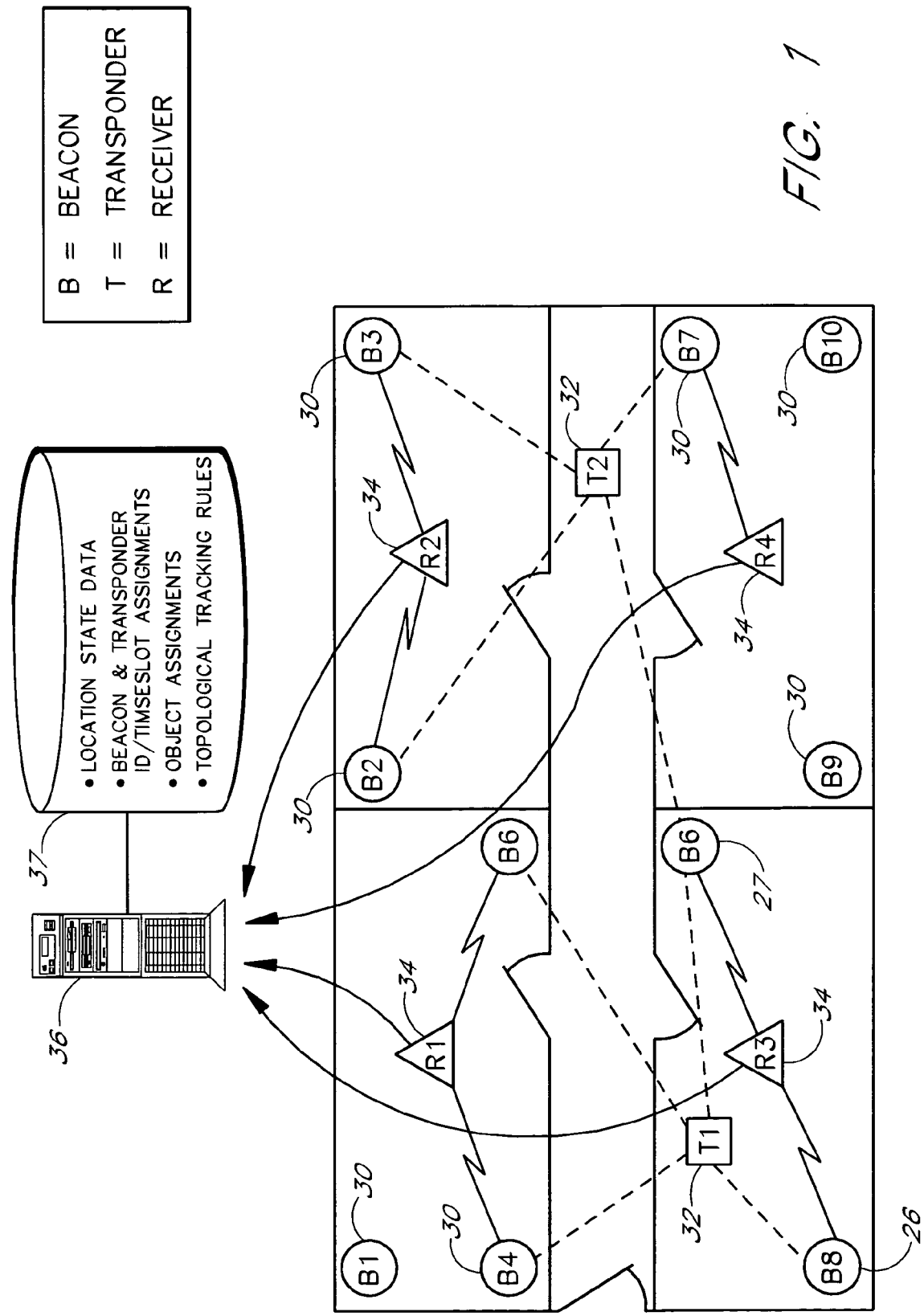
FIG. 1 illustrates an example arrangement of beacons, transponders, and receivers according to a preferred embodiment of the invention.

FIG. 1 illustrates the basic components of a real time object location tracking system according to one embodiment of the invention. The components of the system include beacons 30 mounted to walls or other structures within or around a building, wireless transponders 32 that attach to movable objects to be tracked, and receivers 34 mounted in fixed locations within range of groups of the beacons 30.

The beacons 30 are small, AC-powered or photovoltaic-powered transceiver devices. Each such device 30 periodically transmits a series of low power interrogation signals during an assigned beacon timeslot of a TDMA (Time Division Multiple Access) frame. As discussed below, each interrogation signal includes a beacon ID portion and a portion for measuring distances to nearby transponders 32. The beacon interrogation signals are preferably RF (radio frequency) signals, but could alternatively be ultrasonic. All of the beacons 30 preferably transmit on the same frequency, with the beacons that are in range of one another being uniquely assigned to beacon timeslots to avoid concurrent transmissions.

To maintain synchronization with each other, the beacons 30 preferably monitor the phase of the 60 Hz AC (Alternating Current) power signal on the building's power lines—either directly or by monitoring the flicker of the building's fluorescent lighting. Other methods for maintaining beacon synchronization could alternatively be used. For example, one beacon within each monitoring area could be designated as the master device, and the other beacons in this area could use the transmissions of this device to maintain synchronization. An important aspect of the design is that the beacons need not be synchronized to the same degree of precision as in prior approaches, such as the approach described in the Heller patent referenced above.

As generally illustrated in FIG. 1, the beacons 30 are spatially distributed throughout the areas to be monitored, with two or three beacons 30 typically mounted in each room. The beacon locations are selected such that a monitored object/transponder will ordinarily be in range of at least two, and preferably at least three, beacons 30 at any time. In one embodiment, the maximum beacon-transponder range is approximately 10 meters. As depicted in FIG. 1, the beacons are preferably positioned in the corner areas of the rooms.

The transponders 32 are typically small, battery powered devices that are adapted to be attached to movable objects. As shown in FIG. 2A, a transponder 32 may be in the form of a disposable or reusable wristband or bracelet worn by a patient or other person 38 whose location is to be tracked. In hospital applications, disposable transponder bracelets may be given to patients as they are admitted, and partially or wholly discarded as the patients are discharged. As shown in FIG. 2B and described below, in one embodiment the transponder electronics are provided a recyclable module 32A that plugs into a disposable bracelet portion 32.

Transponders 32 may also be incorporated into employee ID badges, and may be configured for attachment to capital equipment (e.g., portable x-ray machines, defibrillators, and beds), disposable equipment, laptop computers, and other types of devices. As discussed below, transponders 32 may also be incorporated into other types of electronics devices such as PDAs (Personal Digital Assistants), pagers, and patient transceivers used for telemetry.

Each transponder 32 operates generally by listening for and echoing the interrogation signals of nearby beacons 30 during an assigned transponder timeslot. To echo the interrogation signal, each transponder simply frequency-shifts and retransmits the interrogation signal as it is received. The echo signals are thus delayed, frequency-shifted copies or versions of the interrogation signals. In one embodiment (depicted in FIG. 4, discussed below), all of the transponders use the same frequency shift, and thus respond on the same frequency during uniquely-assigned transponder timeslots. In another embodiment (depicted in FIG. 5), two or more transponder echo frequencies (bands) are used, such that two or more transponders can respond during the same transponder timeslot. The unique timeslot or timeslot/frequency pair used by a transponder is preferably specified by (encoded within) the transponder's unique ID.

Figure 3A:
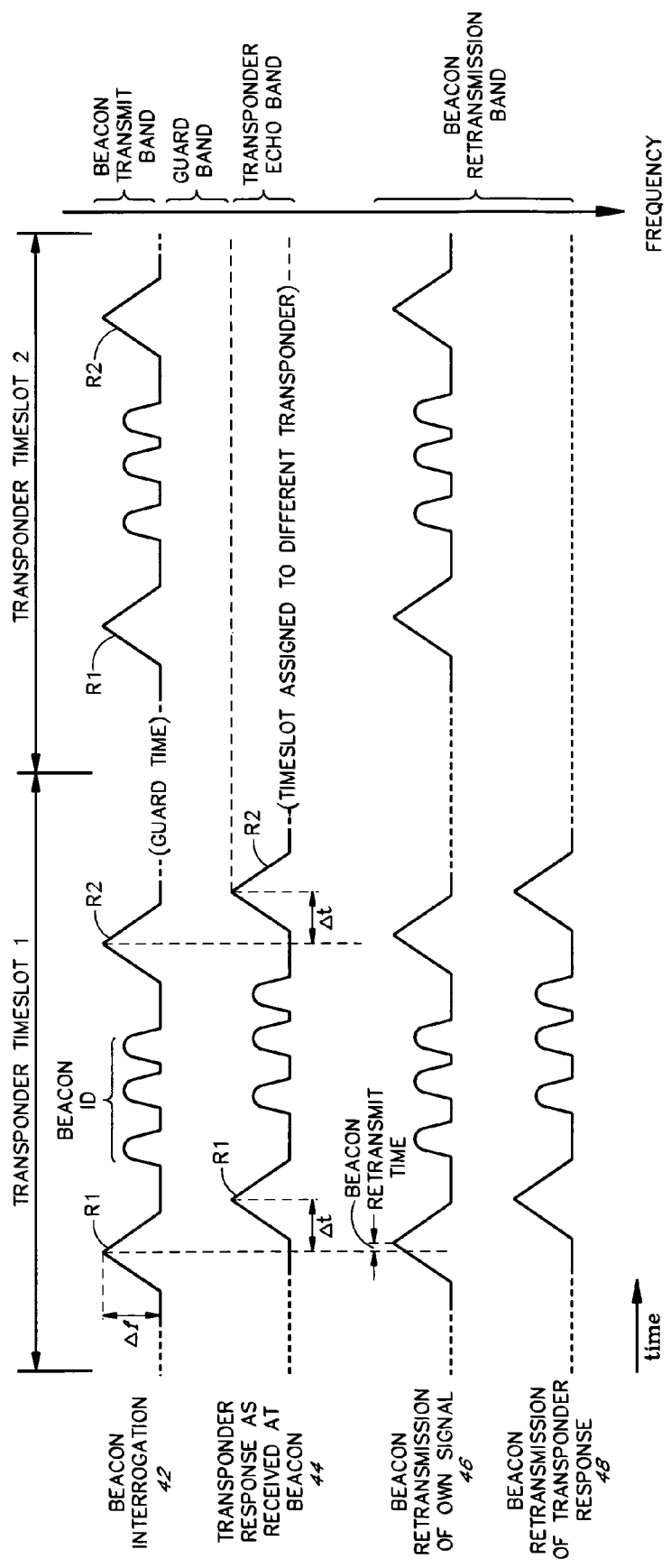
FIG. 3A illustrates example waveforms transmitted by a beacon and a transponder.

During the same transponder timeslot used by a beacon 30 to transmit a low power interrogation signal, the beacon frequency-shifts, and then retransmits to a receiver 34, both (a) the interrogation signal itself, and (b) any the transponder-echoed response ("transponder response") to the interrogation signal. These retransmissions occur at a higher power level than is used for transponder interrogation, and are used by the receiver to determine the distance between the beacon and transponder. Example retransmission waveforms are shown in FIG. 3A, which is discussed separately below.

Because the beacons and transponders 32 do not decode, or convert to baseband, the signals they receive, both types of devices can be manufactured very inexpensively.

In addition, because both types of devices can use low duty cycles (as described below), they have low power requirements. For instance, the beacons can be implemented as photovoltaic-powered devices, and the transponders can be implemented as disposable devices.

The receivers 34 are devices that are positioned in central locations throughout the monitoring areas to receive and process the retransmitted signals from the beacons 30. For example, a receiver 34 may be mounted to the ceilings in selected areas of a hospital. Each receiver 34 is positioned in range of a group of beacons, and is responsible for analyzing the waveforms retransmitted by such beacons. The number of beacons 30 that can be handled by a single receiver depends largely on the construction and layout of the building, and on the power availability as may be specified by FCC or other regulations associated with the relevant frequency band. Typically, one receiver 34 will be provided for every fifty to one hundred beacons 30. A lesser number of beacons per receiver is shown in FIG. 1 for purposes of illustration. In a preferred embodiment, two or more receivers 34 can potentially receive and analyze a set of waveforms from the same beacon. In other embodiments, each beacon 30 could be assigned to a single receiver 34.

Figure 7:
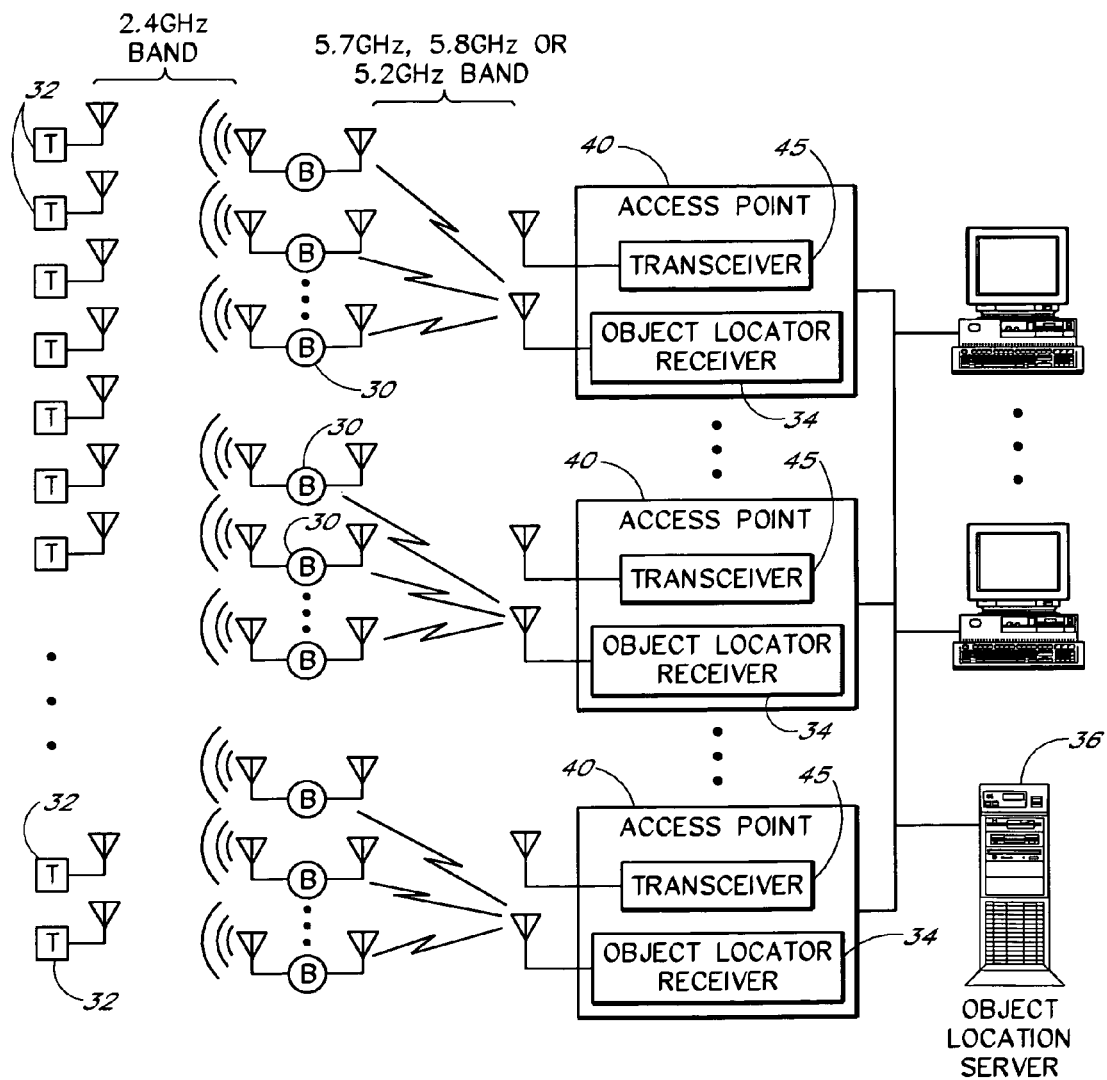
FIG. 7 illustrates a system in which the receivers are included as modules of network access points.

The receivers 34 are preferably hardwire-connected to a processing station, such as a server 36 (FIG. 1), that maintains and provides access to location state information indicating the current and past locations of active transponders 32. As illustrated in FIG. 7 and discussed below, the receivers 34 may be in the form of modules that plug into network access points 40 of a LAN. The receivers could alternatively convey data to the server 36 over the building's power lines, telephone lines, or by wireless communications.

Each receiver 34 operates generally by repeatedly measuring the time difference between the retransmitted versions of an interrogation signal and a corresponding transponder response, as received from a beacon 30. This time difference represents the signal propagation time, and thus the distance, between the beacon and the transponder. This time difference generally reflects signal propagation along the strongest path, which is not necessarily a direct path. Thus, in some cases, a time measurement will not reflect the true distance between a beacon and a transponder.

The receiver 34 forwards the resulting measurement data to the server 36, preferably together with information indicating the identities of the beacon 30 and transponder 32 to which the measurement data corresponds. The receiver 34 could alternatively be designed to send the raw signal waveform data to the server 36 in digitized form, in which case the server 36 or some other processing device could determine the time difference.

To determine the location of a transponder 32, the server 36 analyzes the time difference measurements associated with a combination of beacons—preferably using a hyperbolic triangulation algorithm. For example, to locate transponder T1 in FIG. 1, the server might use the measurements resulting from the beacon retransmissions of B4, B5, B6 and B8, as depicted in dashed lines. As further illustrated, transponder T2 could be located through the triangulation its distance to B2, B3, B6 and B7. The server 36 may also use a topological tracking algorithm to determine the transponder locations, such as when ambiguities exist in the location data produced solely through triangulation. Examples of the types of topological tracking algorithms that may be used are discussed below.

II. Disposable Bracelet Transponder Design (FIGS. 2B and 2C)

As depicted in FIG. 2B, the transponder electronics may be provided as a reusable module 32A that releasably snaps into a receptacle or socket portion of a disposable patient ID bracelet 32B. In this embodiment, the transponder module 32A is preferably water resistant so that it may easily be sterilized between uses. The disposable bracelet portion 32B preferably houses a battery 33 for providing power to the transponder module 32A, and includes contacts 35 that electrically connect the battery to the module's electronics when the module is properly positioned within the wristband socket. As depicted in FIG. 2C, the battery may be a zinc air battery that is penetrated by a spike 35A protruding from the module's outer housing. An air permeable membrane 39 may be provided within the top of the receptacle portion of the wristband 32B to permit air to reach the battery 33 following puncture.

A unique bracelet ID may be encoded within or printed on the disposable bracelet portion 32B such that the ID may be sensed by, or programmed into, the transponder module 32A for use as the transponder's ID. In one embodiment, depicted in FIG. 2C, the ID is printed in conductive ink on the disposable wristband portion 32B. The module 32A reads-in the printed ID code 37A using a set of contacts 37 when the module is inserted.

In another embodiment, the ID is encoded in a set of resistors (not shown) formed within the wristband portion 32B. These resistors are preferably connected in series to provide a voltage divider circuit. In this embodiment, the transponder module 32A applies a voltage across the voltage divider circuit, and uses an analog-to-digital converter to convert the resistor voltage or voltages into the corresponding ID. In yet another embodiment, the ID is provided on a bar code label (not shown) on the wristband portion 32B, and a human operator scans-in this bar code and programs the transponder module 32A (e.g., using an infrared port) when the module is inserted into the wristband 32B.

One optional enhancement to the wristband design is to provide a piezoelectric heart rate sensor (not shown) within the disposable wristband portion 32B. The output of the heart rate sensor may be provided to the transponder module 32A via an additional electrical contact, and may be monitored by the transponder's microcontroller to detect abnormalities (loss of pulse, etc.). When an abnormality is detected, the transponder 32 transmits an alert signal that is detected by nearby beacons, or is forwarded by such beacons for detection by a receiver 34. Ultimately, the alert event is relayed to the server 36, and is used to notify hospital personnel of the possible emergency.

III. Waveform and Timing Diagrams (FIGS. 3–6)

FIG. 3A illustrates example waveforms generated by a beacon 30 and a nearby transponder 32 according to one embodiment. As illustrated by the uppermost graph 42, during its assigned timeslot the beacon repeatedly transmits an interrogation signal (one per transponder timeslot) comprising two, identical, two-sided linear ramp portions (labeled R1 and R2) and a beacon ID portion. The beacon's ID is preferably transmitted using GFSK (Gaussian Frequency Shift Keying), although other types of modulation techniques such as FSK may be used. The general form of a GFSK-encoded beacon ID waveform is shown in greater detail in FIG. 3B with an illustrative 4-bit beacon ID. A beacon ID string of 16 to 32 bits would typically be used in practice.

With further reference to FIG. 3A, the two-sided linear ramp portions R1, R2 are ultimately used by the receivers 34 to measure the time differences mentioned above—preferably by measuring the time differences between corresponding peaks. As illustrated, each linear ramp portion preferably comprises a linear ramp in one direction (linearly increasing or decreasing frequency) followed by a mirror-image linear ramp in the opposite direction. Other types of waveforms that may be used in place of the linear ramps R1, R2 include sawtooth waveforms and root-raised cosine waveforms. A sawtooth waveform may be easier to generate, but generally requires approximately 50% more bandwidth to achieve the same level of position resolution. The use of a root-raised cosine waveform provides better spectral efficiency than the two-sided linear ramp, but generally requires more complex comparison circuitry.

In one embodiment, the interrogation signals are transmitted in the 2.4 GHz ISM band; in this embodiment, the change of frequency ($\Delta f$) that occurs during each linear ramp is preferably in the range of 20 MHz to 60 MHz—and more preferably, about 30 MHz. The time duration of each linear ramp portion R1, R2, may be in the range of about 40 to 100 nanoseconds, assuming about 30 MHz of spectrum (e.g. one half of the 80 MHz available in the 2.4 GHz ISM band, less guard band). Although each interrogation signal preferably has two linear ramp portions R1, R2, a greater or lesser number of ramp waveforms (or other waveforms) may be used. As described below, the two linear ramp waveforms R1, R2 may be used in combination to improve measurement accuracy.

As depicted by the second graph 44 in FIG. 3 (representing the transponder response as received at the beacon), the transponder 32 assigned to timeslot 1 echoes the interrogation signal during timeslot 1, but not during other transponder timeslots. The time difference, $\Delta t$, is equal to twice the signal propagation time (travel time) between the beacon 30 and transponder 32, plus a small retransmission delay inherent within the transponder's circuitry. This retransmission delay is approximately the same for all transponders, and can be subtracted out of the time difference calculation. The transponder's response 44 is separated in frequency from the interrogation signal 42 by a guard band.

As illustrated by the two lowermost graphs 46, 48 in FIG. 3, the beacon 30 retransmits the original interrogation signal, and a frequency-shifted version of the transponder response, within a beacon retransmission band. In one embodiment in which the 2.4 GHz ISM band is used for the transponder interrogation and response transmissions 42, 44, the 5.7 or 5.8 GHz ISM band (or the 5.2 GHz band for Europe) is used for the retransmissions 46, 48. Any other appropriate set of frequency bands may alternatively be used. Further, a single, contiguous frequency band could be used for all of the transmissions 42–48 where government regulations do not require otherwise.

As mentioned above, a receiver 34 within range of the beacon uses the retransmitted signals 46, 48 to estimate $\Delta t$. The estimation is preferably accurate to within about 10 nanoseconds, providing a distance resolution of about three meters or ten feet. As illustrated, the retransmitted interrogation signal (graph 46) may be delayed by a small retransmission time inherent within the beacon's circuitry. The retransmitted transponder response may be similarly delayed (not shown). These small retransmission delays are approximately the same for all beacons, and can treated as constants and subtracted out during the determination of $\Delta t$.

Figure 4:
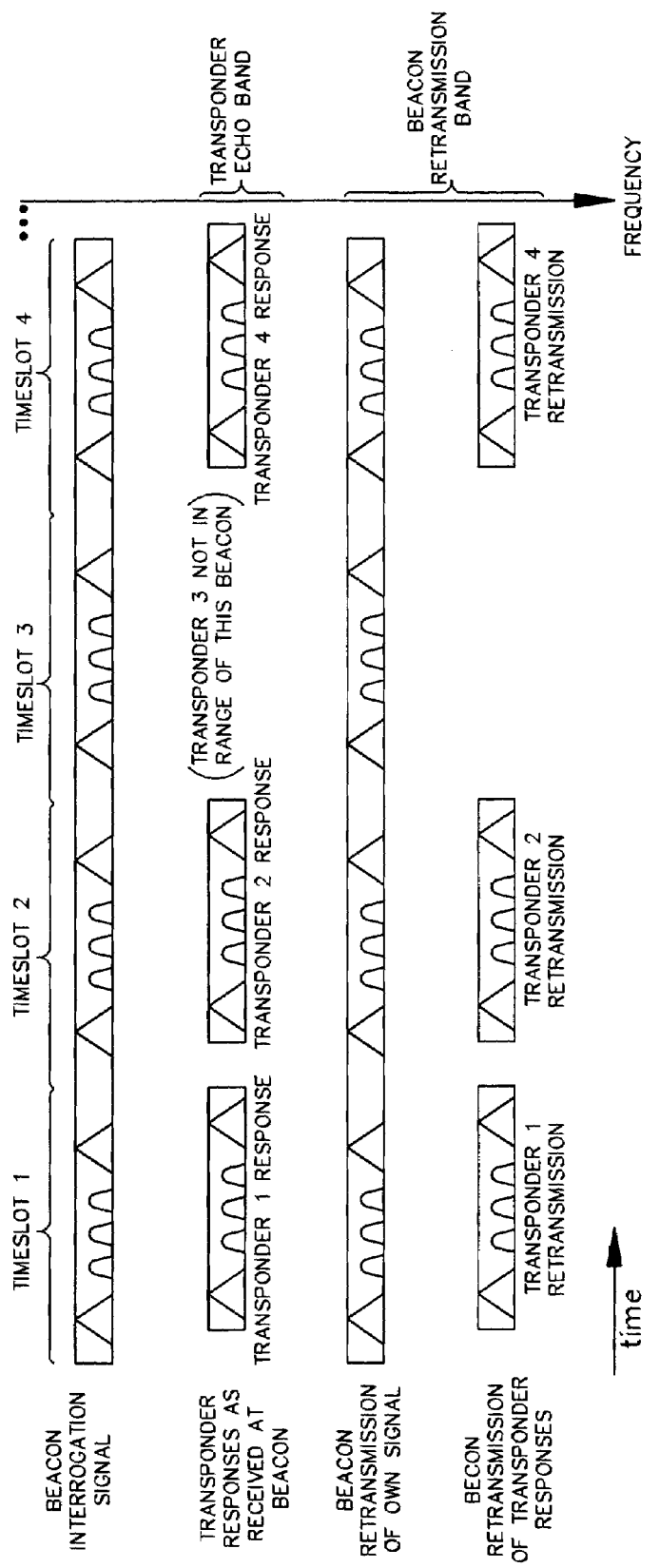
FIG. 4 illustrates an embodiment in which each transponder is uniquely assigned to a transponder timeslot.

FIG. 4 illustrates an embodiment in which all of the transponders 32 respond on the same frequency during uniquely assigned transponder timeslots. An important benefit of this approach is that all of the transponders 32 may be identical in design. In this embodiment, the transponder timeslot on which a transponder's response is received serves as the transponder's identification. For example, since only transponder 1 is permitted to respond during timeslot 1, the identity of the tracked object (patient, etc.) may be determined using a look up table that maps transponder timeslots to objects. A transponder 32 may be programmed with a timeslot assignment (which may be encoded within an ID string) as the transponder is dispatched for use, in which case both the timeslot assignment and the object assignment may be recorded in a central database 37 (FIG. 1).

Figure 5:
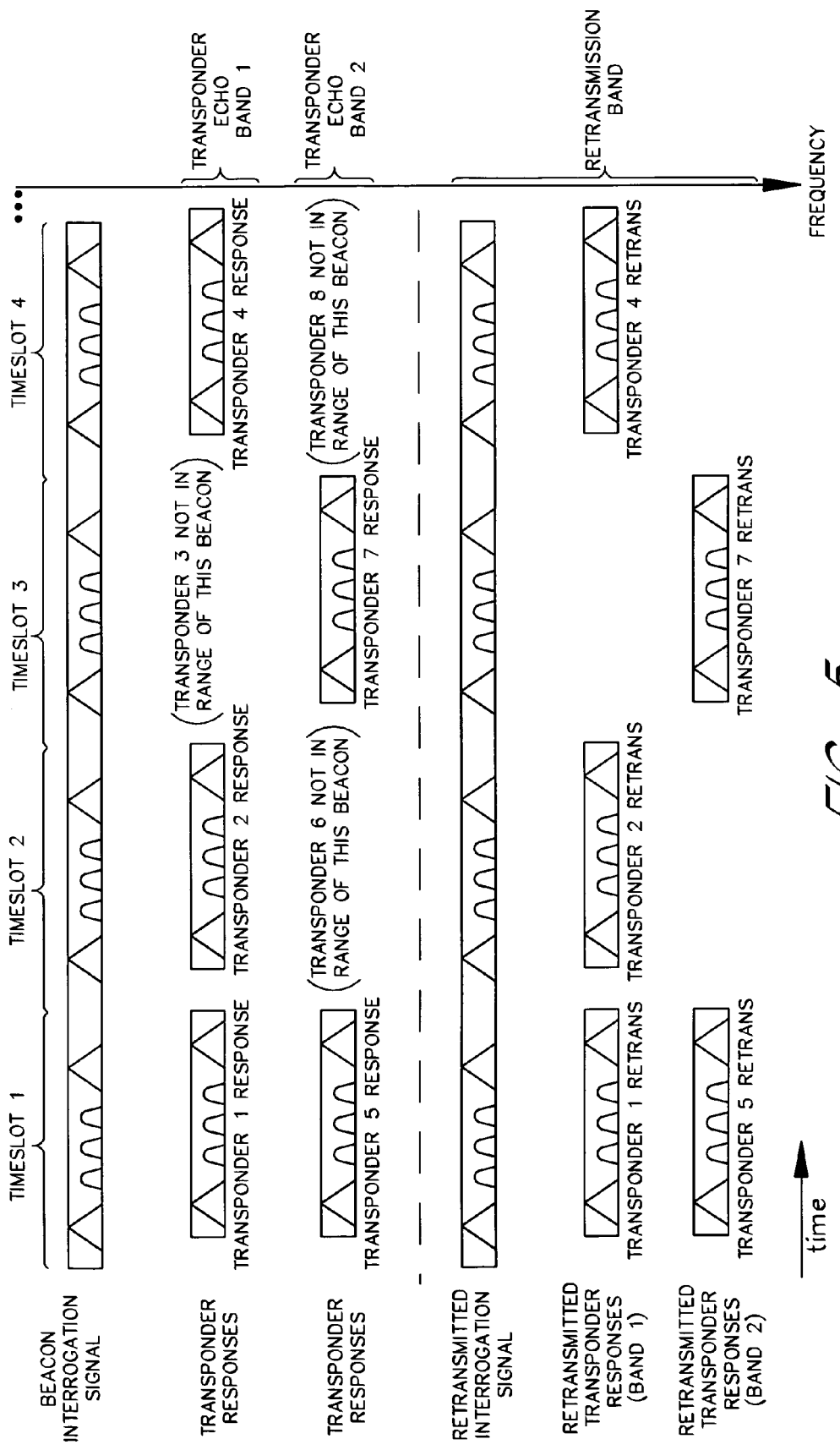
FIG. 5 illustrates an embodiment in which two transponders that use different frequency shifts may share the same transponder timeslot.

FIG. 5 illustrates an embodiment in which two separate transponder echo bands are used. In this embodiment, each transponder 32 is uniquely assigned to, and identified by virtue of, a particular timeslot/frequency pair. For example, transponder 1 is assigned to timeslot 1/echo band 1, and transponder 5 is assigned to timeslot 1/echo band 2. This embodiment permits increased transponder capacity by allowing multiple transponders to share the same timeslot. A greater number of transponder response frequencies may be provided to further increase capacity. To identify an object in this embodiment, the receiver 34 or server 36 may use a table that maps each assigned timeslot/frequency combination to a corresponding object.

Figure 6:
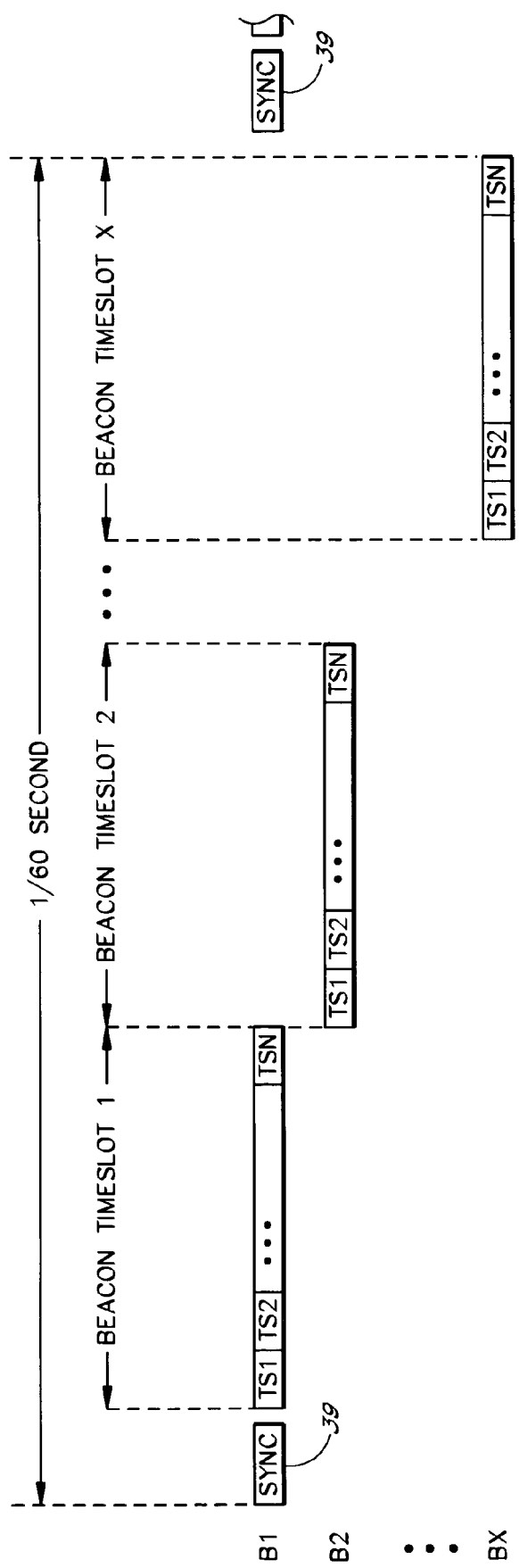
FIG. 6 illustrates an entire TDMA frame.

FIG. 6 illustrates an entire ¹⁄₆₀ second TDMA cycle or frame according to one embodiment. The frame includes X beacon timeslots, each of which is uniquely assigned within a monitoring area to a beacon. Beacons that are in different monitoring areas (i.e., are sufficiently spaced apart to avoid interfering with one another) may be assigned to the same beacon timeslot (not shown). Each beacon timeslot is subdivided into N transponder timeslots, labeled TS1–TSN. In a typical installation, the number of beacons per monitoring area may be about 50, and the total number of transponders 32 may be about 500. In such a configuration, there would be 25,000 transponder timeslots per ¹⁄₆₀ second frame.

A further illustrated in FIG. 6, one beacon 30 within each monitoring area is preferably configured to generate a periodic training or synchronization sequence 39. The synchronization sequence may, for example, be generated using FSK modulation or OOK (on/off keying) of the carrier within the beacon's regular transmit band. This sequence may be transmitted every frame as shown, or may be transmitted once per every Y frames (e.g., 6 times per second). The transponders 32 use the sequences 39 to initially become synchronized with the beacons 30, and may also use the sequences to thereafter maintain synchronization. Any other appropriate synchronization method could be used for this purpose. For example, the transponders 32 could be designed to become coarsely synchronized with the beacons by monitoring the 60 Hz flicker of the building's lighting, and to then become more finely synchronized by monitoring the interrogation signals of the beacons.

Although FIG. 6 depicts each beacon 30 as transmitting during every TDMA frame, the beacons could be designed to transmit on a less frequent basis when transponder activity in the area is low. For instance, as described below, the beacons may include circuitry for detecting whether any transponder responses are being received in a particular transponder timeslot. When no responses have been received for a period of time on a particular transponder timeslot, a beacon may reduce the frequency with which it transmits an interrogation signal on the transponder timeslot. In addition, if a beacon does not detect any response in any transponder timeslot for an extended period of time, the beacon may enter a general low activity state to conserve power and to reduce the overall emission of RF energy.

Further, although the beacon timeslots are depicted as being statically assigned, a timeslot dithering method may be used (as described below in section X) to avoid the possibility of lockstep interference between beacons.

IV. Integration of Receivers with Network Access Points (FIG. 7)

FIG. 7 illustrates how the receivers 34 may be provided as fixed or plug-in modules of network access points 40. As illustrated, each access point 40 includes at least one transceiver 45 for communicating bi-directionally with general purpose wireless devices (e.g., IEEE 802.11 devices) and/or special purpose wireless devices (e.g., patient transceivers used for real time telemetry of physiologic data). In one embodiment, some or all of the access points 40 are multi-band/multi-purpose access points of the type described in U.S. application Ser. No. 09/615,362, filed Jul. 13, 2000, the disclosure of which is hereby incorporated by reference. Each such multi-band/multi-purpose access point 40 may be configured to concurrently handle wireless Ethernet traffic using an 802.11 protocol, real time telemetry traffic using a TDMA protocol, and beacon retransmission traffic.

Each object locator receiver 34 preferably plugs into a communications slot (not shown) of the access point unit.

The receiver 34 could alternatively attach to the access point unit by an electrical cord or tether such that the receiver may be positioned away from the other access point components. One or more transceivers 45 may likewise be attached to the access point unit by a tether. The access points 40 are preferably ceiling-mounted devices, as described in the above-referenced application, and as described in U.S. Pat. No. 5,944,659 which is also hereby incorporated by reference.

In one embodiment, the access points 40 are positioned throughout areas of a hospital, and the receivers 34 are used to track the locations of patients, hospital personnel, capital equipment, and/or disposable equipment. To track disposable equipment, a special transponder 32 may be used that automatically deactivates itself (discontinues transmissions) when detached from the disposable item. The transponder may also or alternatively be designed to transmit a special signal upon detachment. When a clinician detaches the transponder 32 from the disposable item, a software application running on the LAN detects the detachment event and updates an inventory database accordingly. The object location monitoring system is thus used to monitor both the locations and the inventory of the disposable items.

V. Example Beacon Circuit (FIGS. 8 and 9)

Figure 8:
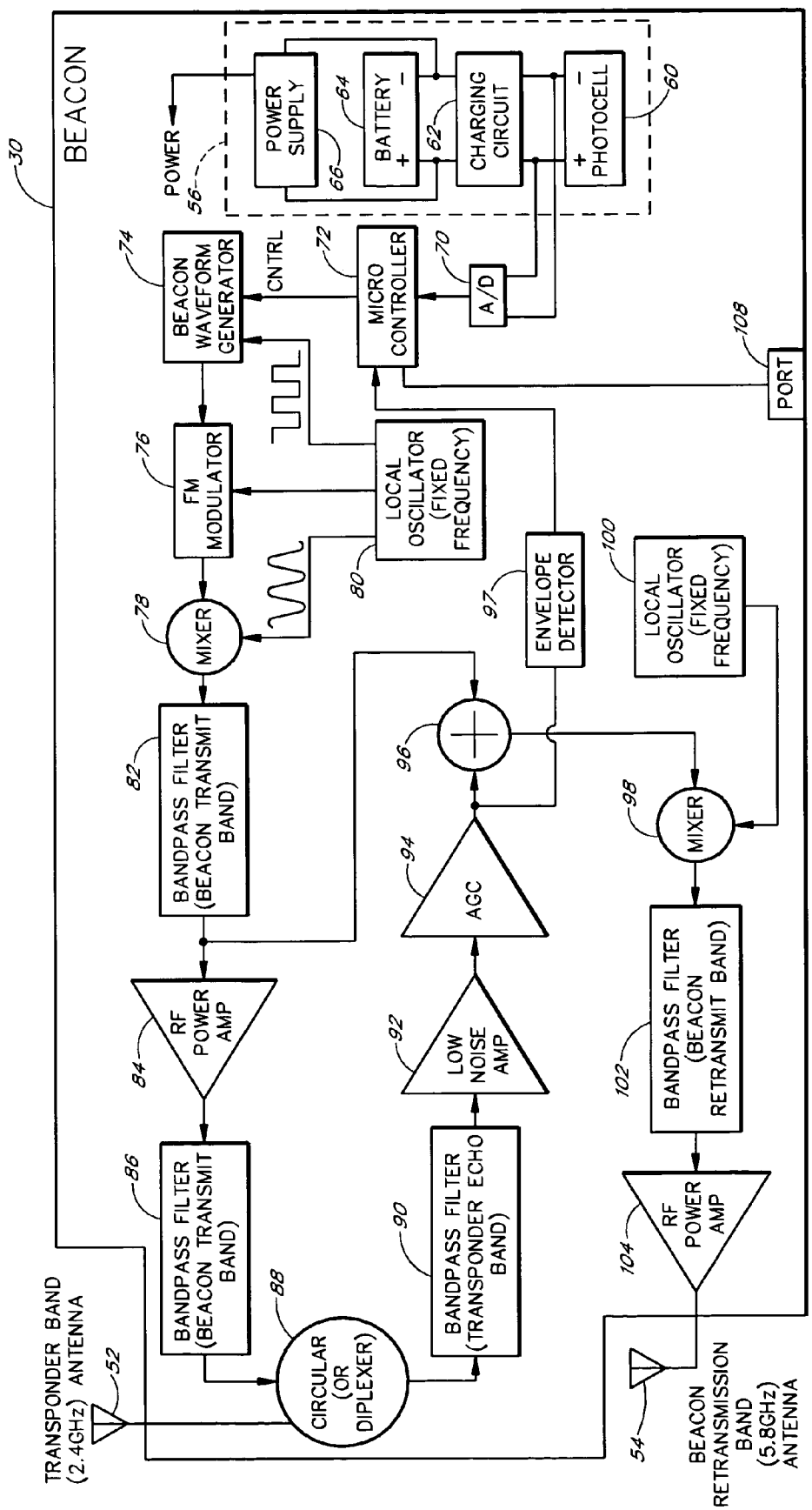
FIG. 8 illustrates an example beacon circuit.
Figure 9:
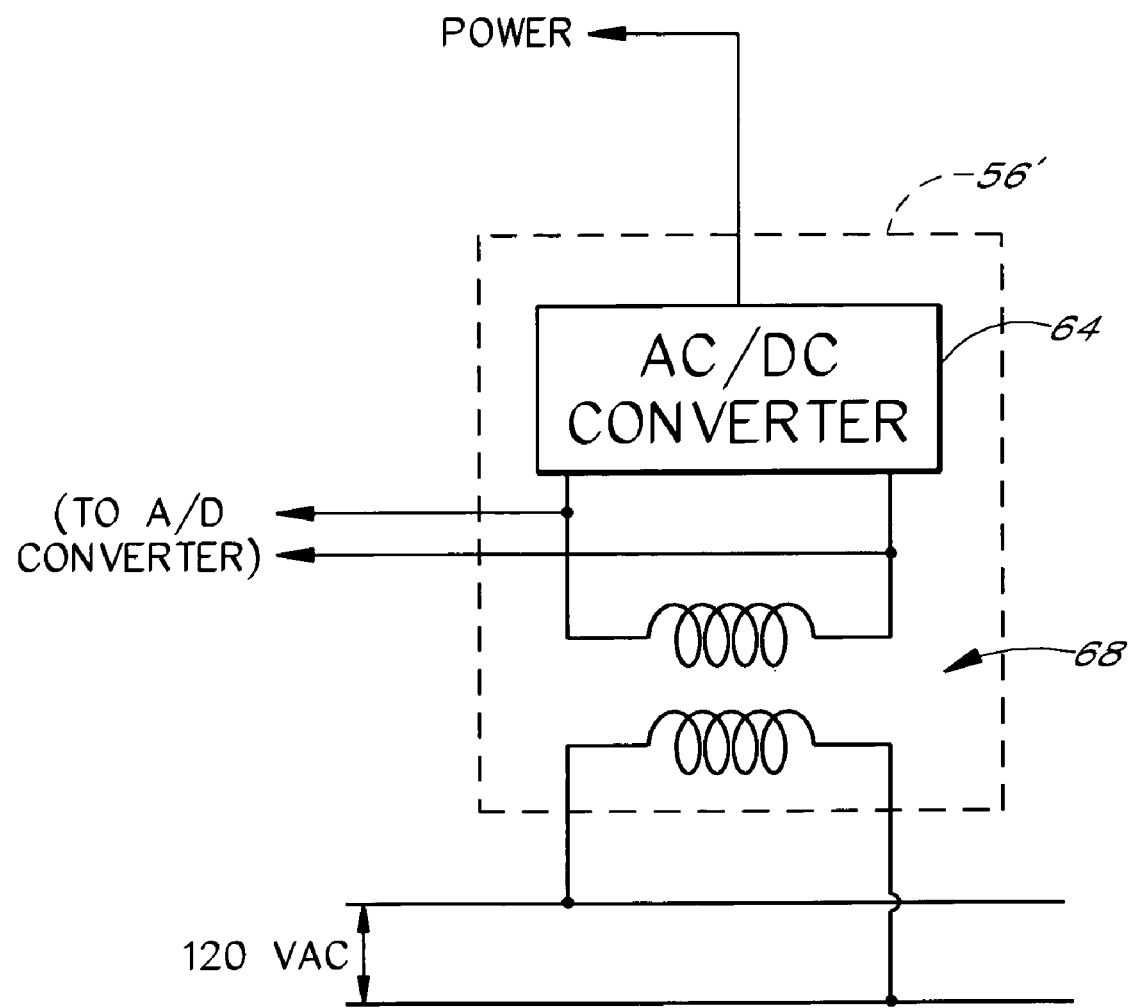
FIG. 9 illustrates an AC power circuit that may be used in place of the photovoltaic power circuit of FIG. 8.

FIG. 8 is a block diagram of a beacon 30 according to one embodiment of the invention. As illustrated, the beacon preferably includes two antennas, 52 and 54. The first antenna 52 is used to transmit interrogation signals (and where applicable, synchronization signals), and to receive the transponder responses. The second antenna 54 is used for the retransmissions of the interrogation signals and transponder responses. Directional antennas may be used for one or both of these antennas 52, 54. In embodiments in which a single frequency band is used for all beacon communications, the two antennas may be replaced with a single antenna.

In the illustrated embodiment, the beacon 30 includes a photoelectric power circuit 56 that provides power to beacon's active components. In an AC-powered implementation, this circuit 56 may be replaced with the circuit 56' shown in FIG. 9. The photoelectric power circuit 56 comprises a photoelectric cell 60 having its outputs connected to a charging circuit 62. A lens, mirror, or other type of light-concentrating device (not shown) may be attached to or formed within the housing of the beacon to focus light on the photocell 60. The charging circuit 62 charges a battery 64 when a sufficient amount of light energy is present. The terminals of the battery 64 are connected to a power supply circuit 66 that supplies DC power to the beacon's active components. The power supply 66 preferably includes a capacitor (not shown) or other energy-storing device for providing bursts of power during transmission events. In the AC embodiment (FIG. 9), the power circuit comprises a transformer 68 that connects to the standard AC power lines in the building. The low-voltage side of the transformer 68 is connected to an AC/DC converter 69.

In both embodiments (photovoltaic and AC), the beacon 30 includes an analog-to-digital (A/D) converter 70 used for AC phase detection. The A/D converter 70 converts the photovoltaic signal (FIG. 8) or the AC power signal (FIG. 9) to a digital signal that is processed by the beacon's microcontroller 72. The microcontroller 72 detects the peaks, troughs, and/or other cyclic events within this digital signal, and uses these events in combination with preprogrammed timing offset data to determine when to commence a transmission. Some or all of these tasks may alternatively be performed by a special analog or digital circuit, without the use of a microcontroller.

The signal path used to generate the interrogation and any synchronization signals includes a waveform generator 74 that feeds an FM (Frequency Modulation) modulator 76. The output of the FM modulator is connected to a mixer 78. The mixer combines the FM-modulated waveform with the output of a local oscillator 80 to perform RF upconversion to the beacon's interrogation band. The output of the mixer 78 is passed through a bandpass filter 82 that attenuates signals falling outside the transmit band. The output of this filter 82 is amplified by a power amplifier 84, and is also fed to the beacon's retransmission path (described below). The amplified output signal is passed through another bandpass filter 86 to remove out of band noise introduced during amplification, and is then transmitted from the antenna 52.

The antenna 52 is coupled to both the interrogation signal path and a receive path by a circulator 88, or alternatively a diplexer. The circulator 88 or diplexer allows the antenna 52 to be simultaneously used to transmit interrogation signals and receive transponder responses. The transponder responses are extracted using a bandpass filter 90 that attenuates signals falling outside the transponder echo band (or bands). The filtered transponder responses are passed through a low noise amplifier 92 and an automatic gain control (AGC) component 94. A summer 96 combines the amplified/gain-adjusted transponder responses with the unamplified output of the interrogation/synchronization signal path.

As shown in FIG. 8, the output of the ACG 94 may also be connected to an optional envelope detector 97. The purpose of the envelope detector is to allow the beacon's microcontroller 72 to determine whether any transponder responses are being received. The microcontroller may place the beacon in a low activity state, as described above, when few or no transponder responses are being received. The microcontroller may also reduce interrogations in some transponder timeslots and not others. For example, if no response has been received on transponder timeslot 1 for a significant amount of time, the beacon may enter a low activity state with respect to transponder timeslot 1 but not other transponder timeslots.

The retransmission signal path comprises a mixer 98 that up-converts the output of the summer 96 using the output of a second oscillator 100. The two oscillators 80, 100 are logically separate, but may be implemented as a single, multiple-frequency synthesizer. The output of the mixer 98 is passed through a bandpass filter 102 that attenuates signals falling outside the beacon's retransmission band, and is then amplified and transmitted from the beacon's retransmission antenna 54.

As further illustrated in FIG. 8, the beacon 30 includes a programming port or device 108, such as an infrared port, a serial data port, or a set of DIP switches, for assigning IDs and timeslots to the beacons 30 during installation. The port or device 108 may also be used to specify whether the beacon is to transmit synchronization sequences 39 (FIG. 6). In other embodiments, the beacon's receive path may be used for beacon programming. The beacon ID may be stored in a register (not shown) within or coupled to the waveform generator 74.

In operation, the microcontroller 72 maintains the active signal processing components of the beacon 30 in an inactive or low power state during the beacon timeslots other than its own. During the beacon's assigned timeslot, the microcontroller controls the waveform generator 74 to generate the linear ramp waveforms R1, R2 and the GFSK/ID portion of each interrogation signal. The GFSK/ID portion may be generated based on the beacon's ID, and may include appropriate error correction coding. The waveform generator is also used to generate the synchronization sequences 39, which are preferably FSK sequences that alternate between a high and a low frequency. The interrogation and retransmission signals are otherwise generated and transmitted as described above.

VI. Example Transponder Circuit (FIG. 10)

Figure 10:
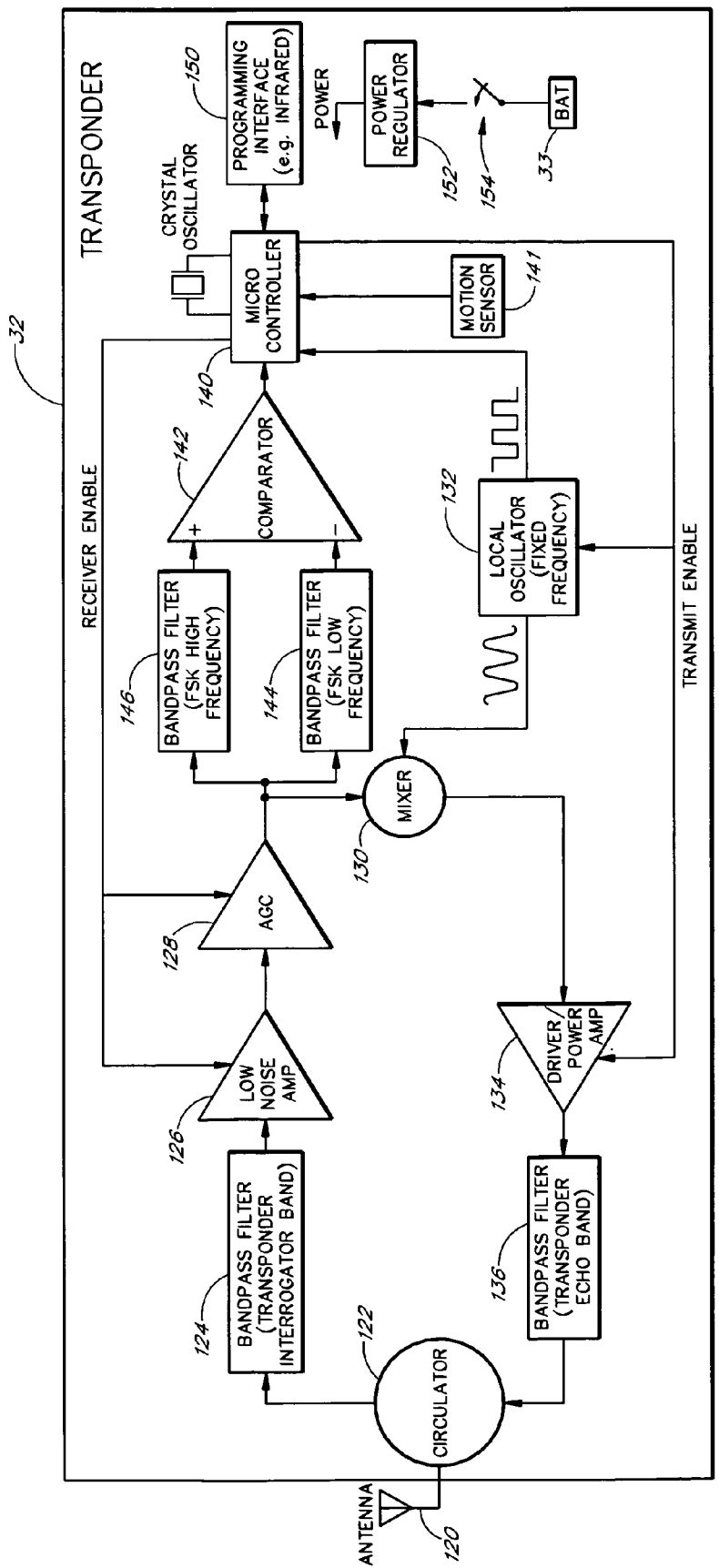
FIG. 10 illustrates an example transponder circuit.

FIG. 10 illustrates an example transponder circuit. The transponder 32 includes a single antenna 120 connected to a circulator 122. The circulator enables the antenna to be simultaneously used to both receive and echo signals. The receive path includes a bandpass filter 124 that attenuates signals falling outside the interrogation band. The filtered signal is passed through a low noise amplifier 126, and is adjusted in amplitude by an automatic gain control (AGC) circuit 128.

When the transponder 32 is in a synchronized state, transponder's microcontroller 140 turns the receiver and transmit enable lines on and off such that the transponder receives and echoes beacon interrogation signals only during its assigned transponder timeslot. The active transmission and receiving components are thereby maintained in low power states during unused timeslots (typically about 95–99% of the time).

To further conserve power, a motion sensor 141 may optionally be incorporated into the design, in which case the microcontroller 140 may maintain the active transmit and receive components in low power states when little or no movement is detected. In one embodiment, the transponder 32 adjusts its duty cycle over time based on the amount of motion detected. For example, when little or no motion is detected over a predefined time window, the transponder 32 may use only a small fraction of its assigned timeslots.

During the transponder's assigned timeslot (assuming the transmit and receive components are active), a mixer 130 combines the output of the AGC circuit 128 with the output of a local oscillator 132. This causes the received beacon interrogation signal to be shifted in frequency for retransmission. The frequency-shifted signal is amplified by a driver/power amplifier circuit 134, and is then passed through a bandpass filter 136 that attenuates signals falling outside the echo band. The resulting signal is transmitted as the echo signal.

When the transponder 32 is not synchronized with the beacons 30 (e.g., when the transponder is first turned on), the transponder enters into a training state in which it listens for beacon synchronization sequences 39. The microcontroller 140 maintains the oscillator 132 and the driver/power amplifier 134 in a disabled state during this time, so that transmissions are inhibited. To become synchronized, the microcontroller 140 detects transitions between an FSK low frequency and an FSK high frequency used within the synchronization sequence 39. This is accomplished by monitoring the output of a comparator 142 that compares the amount of energy at the FSK low frequency (as extracted by one bandpass filter 144) to the amount of energy at the FSK high frequency (as extracted by a second bandpass filter 146). In embodiments in which on/off keying is used to generate the synchronization sequence 39, this energy comparison circuit may be replaced by an envelope detector.

As with the beacons, each transponder 32 includes a programming interface 150, such as an infrared port, to permit the device to be externally programmed with an ID and other configuration information. As indicated above, in bracelet embodiments, the programming interface 150 may be a circuit for reading an ID encoded in conductive ink, or a circuit for measuring a voltage divider circuit. The ID may specify the unique transponder timeslot, or the unique timeslot/echo band combination, to be used by the transponder.

As further depicted by FIG. 10, the transponder 32 is powered by a battery 33 that is connected to a power regulation circuit 152. In bracelet embodiments (FIG. 2B), the battery 33 may be housed within the plastic receptacle portion of the disposable bracelet 32B.

As illustrated, a manual or a magnetically activated switch 154 may be provided for turning the transponder on and off. In one embodiment, the switch 154 is integrated with an object attachment structure such that the switch moves from a closed to an open position when the transponder is detached from object. As described above, this feature may be used to monitor inventory of disposable equipment.

Although the transponder 32 is typically in the form of an independent or standalone device, the transponder could be integrated within a more complex electronic device. For example, the transponder may be incorporated into a personal digital assistant (PDA) unit, a pager, or a wireless patient transceiver unit used for medical telemetry. In such designs, the transponder may share one or more components with the host device, such as processor, antenna, receiver, transmitter, battery, and/or programming port.

VII. Example Receiver Circuit (FIG. 11)

Figure 11:
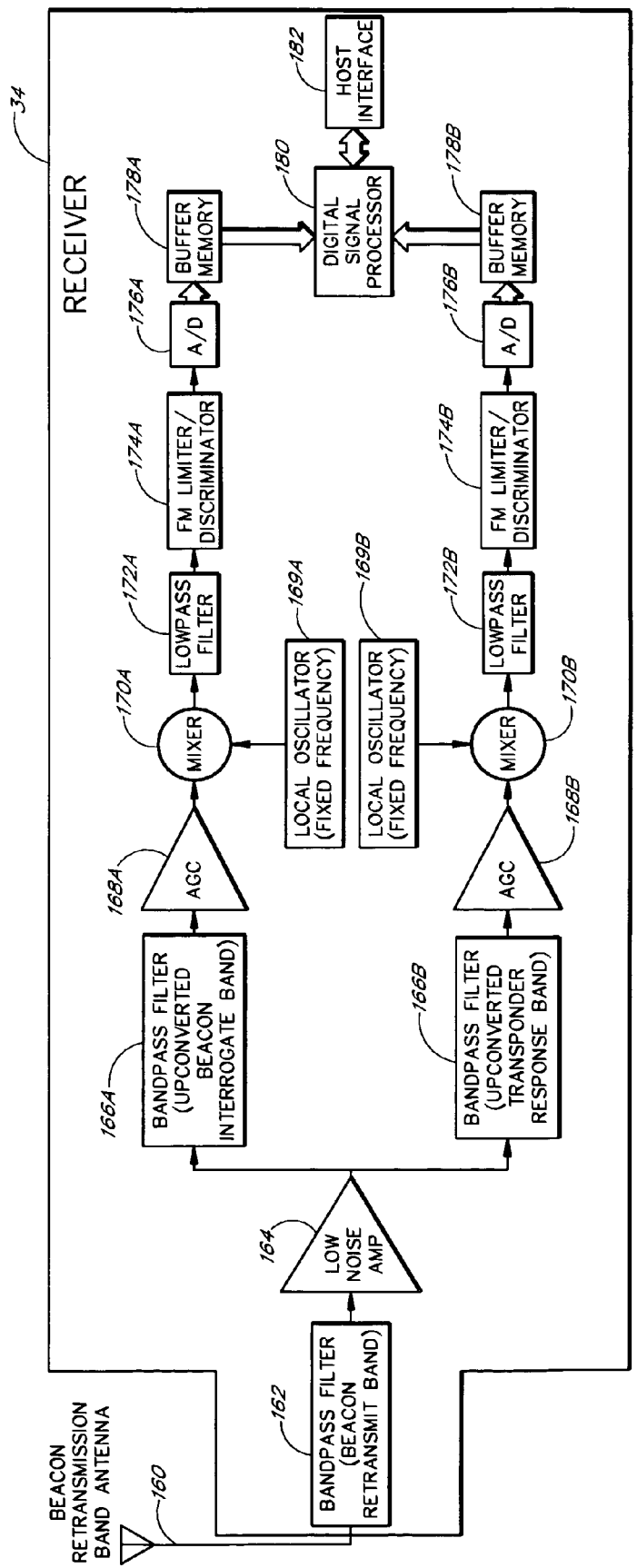
FIG. 11 illustrates an example receiver circuit.

FIG. 11 illustrates an example receiver circuit that may be used. The receiver 34 has an antenna 160 connected to a first bandpass filter 162. The antenna may optionally be steerable such that it may be pointed in the directions of specific beacons 30. The bandpass filter 162 attenuates signals falling outside the beacon retransmission band. The output of the bandpass filter 162 is passed through a low noise amplifier (LNA) 164. The purpose of the first bandpass filter 162 is to prevent desensitization of the receiver 34, which may be caused by non-linearities in the LNA 164. Specifically, a strong out-of-band signal, if not sufficiently attenuated, could cause non-linearities in the LNA which produce components in the band of interest.

The received signal is then split, using a pair of bandpass filters 166A, 166B to separate the retransmitted interrogation signals from the retransmitted transponder responses. These two signals are then processed along functionally equivalent direct conversion FM receiver chains, each of which comprises an AGC circuit 168, a mixer 170 and associated oscillator 169, a low pass filter 172, and an FM limiter/discriminator 174. The output of each receiver chain is converted to a digital signal by a respective analog-to-digital converter 176A, 176B, and is then stored temporarily in a buffer memory (logically shown as two separate memories 178A, B) for analysis.

The task of detecting the peaks of the linear ramp signals R1, R2 (FIG. 3), and determining the time difference $\Delta t$, is preferably performed by a digital signal processor 180 using methods that are known in the art. An ASIC (Application Specific Integrated Circuit) or other special-purpose circuit could alternatively be used for this purpose.

To improve measurement accuracy, the receiver 34 may use both linear ramps R1, R2 included within an interrogation signal. For example, referring to FIG. 3, the receiver 34 could measure the time difference between the two R1 peaks and between the two R2 peaks. The receiver could then take the average of these two measurements, or retain only the measurement deemed to be the most reliable. Further, the receiver 34 could use the R1 signal to estimate when the R2 peak will arrive, and then use this estimate to gate-in the R2 signal (to reduce noise). The digital signal processor 180 also extracts the beacon IDs from the signals.

Each time the receiver 34 successfully compares the retransmitted versions of an interrogation signal and a corresponding transponder response, the receiver transmits, via a host interface 182, the beacon's ID together with a value indicating the measured time difference. The receiver 34 may also output data indicating the transponder timeslot on which the signals were received. The timeslot information could alternatively be determined based on the timing of the receiver's data transmission.

Figure 12:
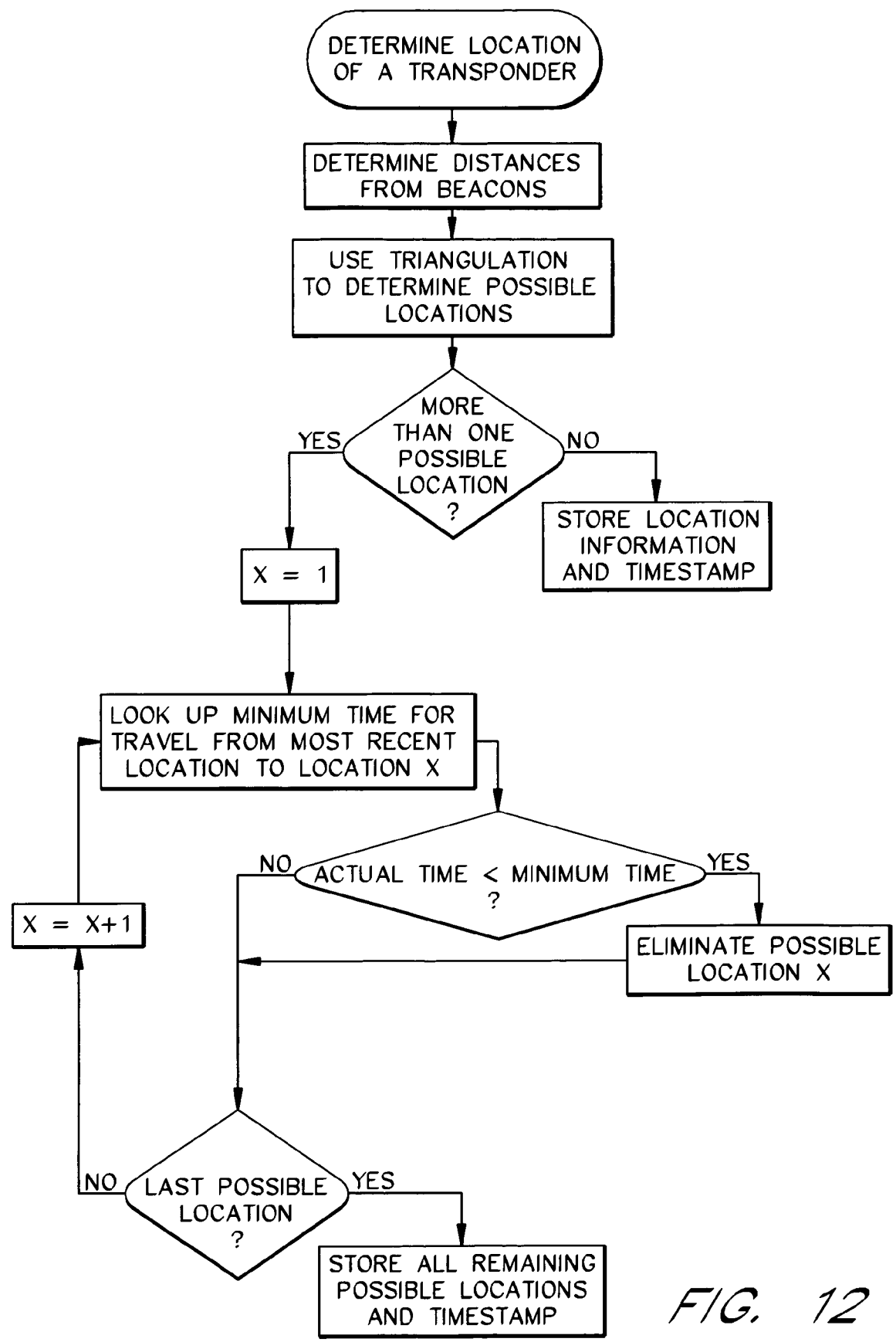
FIG. 12 illustrates a method by which a transponder may be located using a combination of triangulation and topological tracking.

VIII. Determination of Transponder Locations (FIG. 12)

As described above, the time measurements associated with the same transponder 32 but different beacons 30 are used in combination to determine the current location of each transponder. This may be accomplished using a hyperbolic triangulation algorithm as in known in the art.

To reduce or resolve ambiguities in the resulting location data, a topological tracking method may be used to exclude transitions that are unlikely or impossible. This may be accomplished using a pre-generated database 37 of minimum travel times between pairs of locations. For example, the database may indicate that the minimum time required for an object to travel from room 1 to room 2 is twenty seconds. Detected movements that fall below these minimum travel times may be treated as suspect or invalid.

The topologic tracking method may additionally or alternatively use rules that specify plausible state transitions without regard to travel time. For example, if a transponder 32 was last determined to be in room 1, and there is object locator coverage in the hallway that provides the only path from room 1 to room 2, the system may treat a direct transition from room 1 to room 2 (without intermediate detection in the hallway) as suspect or invalid.

FIG. 12 illustrates a basic method that may be used to determine the current location of a transponder 32 using a combination of distance measurements and minimum travel times. This method may be embodied within a software module executed by the object locator server 36. Initially, the distances between the transponder 32 and a set of beacons 30 are determined using a most recent set of Δt measurements. Hyperbolic triangulation is then used to estimate the transponder's current location. Depending upon the number of beacons in the set, and the accuracy of the time measurements, the triangulation process may render a single possible location or multiple possible locations. If triangulation reveals a single location with a sufficiently high degree of certainty, this location may be stored as the current location together with a time stamp.

If multiple possible locations are identified, the process enters into a loop in which a table of minimum travel times is used to attempt to eliminate the ambiguity. Specifically, for each possible current location (X=1, 2, . . . ), the process determines whether the travel time from the most recent location to the candidate current location is less than the pre-specified minimum. If so, the process eliminates that location as a candidate. As indicated above, the topologic tracking process may also use rules regarding plausible state transitions to resolve ambiguities. For example, a "jump" from location A to location C, without intermediate detection in location C, may be treated as invalid.

Once all of the candidate locations have been evaluated, the remaining location candidates are stored. The identities of the eliminated locations may also be stored for use in subsequent iterations. If multiple locations remain at this point, the database 37 may be updated to reflect that object's current location is unknown.

IX. Ultrasonic Embodiments

As mentioned above, the beacons 30 and transponders 32 may alternatively be designed to operate using ultrasonic (non-RF) transmissions. The theory of operation is the same, but the time difference measurements reflect the speed of sound rather than the speed of light. Thus, to resolve distances to within 3 meters, a time resolution of 10 milliseconds is needed. A much longer beacon timeslot is preferably used—longer than that of the 60 Hz AC phase. Additionally, transponder identities may be encoded largely or entirely in frequency offset, rather than largely or entirely in transponder timeslots. Ultrasonic beacons may be synchronized to each through any appropriate means, such as an RF synchronization signal.

As discussed below in section XI, one enhancement that may be used in ultrasonic embodiments is the use of the building's power lines to convey the beacon retransmission signals.

X. Dithering of Beacon Timeslots to Avoid Lockstep Interference

As mentioned above, two or more beacons 30 that are not within range of each other may be assigned to the same beacon timeslot. In such installations, multiple beacons may transmit on the same frequency at the same time. Normally, such coincident transmissions do not interfere with each another because these beacons are sufficiently spaced apart. In some circumstances, however, an anomalous propagation may occur, causing one or more transponders 32 and/or receivers 34 to receive transmissions from two beacons simultaneously. For example, an air conditioning duct may act as a waveguide with respect to the beacon transmission or retransmission frequency, causing a beacon's signal to propagate to remote areas. In such circumstances, the coincident beacon transmissions may be partially or wholly unusable.

If the beacon timeslots assignments are fixed, the interference between the coincident beacon transmissions may occur in lock step until the source of the anomalous propagation is eliminated. To reduce or avoid such lockstep interference, the beacons 30 may be designed to use a timeslot varying or "dithering" method in which the beacons rotate or otherwise vary their transmission timeslots over time according to a predefined and coordinated pattern. For example, all beacons within monitoring area A may rotate their timeslot assignments by one slot position per TDMA frame, while all beacons in monitoring area B (which is remote from area A) rotate their timeslot assignments by two slot positions per TDMA frame. The sequences or patterns used to vary the beacon timeslot assignments may be selected such that if any given pair of beacons produces coincident transmissions during a particular frame, that pair will not again produce coincident transmissions for a large number of consecutive frames. Configuration data specifying the dithering patterns may be uploaded to the beacons during device installation and programming.

XI. Use of Building Power Lines to Convey Beacon Retransmissions

Another variation in the system design is to use the preexisting power lines of the building, rather than a wireless channel, to convey the beacon retransmission signals from the beacons 30 to a receiver for analysis. This approach is preferably used in embodiments in which the beacons 30 are AC-powered devices that use ultrasonic interrogation signals. An important benefit to using the power lines to convey the beacon retransmissions is that the need for multiple receivers 34 per installation is reduced or eliminated.

In a preferred embodiment of this feature, when a beacon 30 transmits an (ultrasonic) interrogation signal, the beacon simultaneously retransmits the interrogation signal on the AC power lines to which the beacon is connected. The beacon also retransmits on the AC power lines any resulting transponder response it receives. The interrogation and response signals may, but need not, be shifted in frequency prior to retransmission on the power lines.

A central receiver 34 connected to the AC power lines receives the retransmitted signals, and calculates the difference between the two signals using the same methods as described above. Because of the increased transmission range provided by the power lines, a single receiver 34 can process the retransmitted signals for a large group (e.g., 100 or more) beacons. The central receiver 34 may, for example, be implemented as a receiver card that plugs into a slot of the server 36. To permit remote beacons to share the same beacon timeslot, two or more separate retransmission bands may be used, each of which is assigned to the beacons in a respective monitoring area.

Although the invention has been described in terms of certain preferred embodiments, other embodiments that are apparent to those of ordinary skill in the art including embodiments which do not provide all of the features and advantages set forth herein are also within the scope of the invention. Accordingly, the scope of the invention is defined by the claims that follow.

What is claimed is:

1. A system for monitoring locations of movable objects, comprising:
   a plurality of beacons mounted in spatial distribution throughout a monitoring area of a building, each beacon transmitting wireless interrogation signals during assigned timeslots of a time division multiple access (TDMA) frame wherein the wireless interrogation signals include a root-raised cosine waveform;
   a plurality of transponders, each transponder adapted to be attached to a moveable object, and to respond to the interrogation signals received from the beacons only during a pre-determined transponder timeslot of the TDMA frame by echoing frequency-shifted versions of the interrogation signals ("transponder responses"), wherein the transponder responses are received by at least one of the beacons;
   a receiver configured to receive a retransmitted interrogation signal and a retransmitted received transponder response from each beacon, wherein the receiver analyzes signals received from the plurality of beacons and identifies the transponder based on the timing of the transponder response within the TDMA frame;
   wherein each beacon wirelessly retransmits the retransmitted interrogation signal and the received resulting transponder response to the receiver for analysis, and the receiver determines a time different between the retransmitted interrogation signal and the transponder response retransmitted by the beacon, said time different reflecting a distance between the beacon and the transponder; and
   a computer system in communication with the receiver, wherein the computer system uses time differences measured by the receiver in combination with a topological tracking method to determine the locations of the objects.

2. The system as in claim 1, wherein the plurality of beacons become synchronized with each other by monitoring a phase of an alternating current (AC) power signal on power lines of the building.

3. The system as in claim 2, wherein at least some of the beacons monitor the phase of the AC power signal by monitoring an AC flicker of lights within the building.

4. The system as in claim 1, wherein at least some of the beacons are photo-electrically powered.

5. The system as in claim 1, wherein the wireless interrogation signals are radio frequency (RF) signals.

6. The system as in claim 1, wherein the wireless interrogation signals are ultrasonic signals.

7. The system as in claim 1, wherein each interrogation signal includes a linear ramp portion in which a frequency of the interrogation signal is ramped linearly over a period of time, and wherein the receiver measures a time difference between the linear ramp portion as included in the transmitted interrogation and transponder response signals received from a beacon.

8. The system as in claim 7, wherein the receiver measures the time difference by detecting, and determining a time difference between, peaks of the linear ramp portion.

9. The system as in claim 1, wherein each beacon transmits the interrogation signal and the resulting transponder response to the receiver over AC power lines of the building.

10. The system as in claim 1, wherein at least some of the transponders are wristbands adapted to be worn by patients.

11. The system as in claim 1, wherein at least one of the transponders comprises a transponder module which is adapted to be inserted into a disposable wristband.

12. A method of determining the distance between a beacon and a transponder, comprising:
   (a) transmitting an interrogation signal by wireless communications from the beacon to the transponder during a TDMA timeslot assigned to the beacon within an interrogation frequency band of the transponder to cause the transponder to return a response signal, the transponder returning the response signal only during a pre-determined transponder timeslot that is a portion of the TDMA timeslot, the response signal being a frequency-shifted version of the interrogation signal wherein the wireless interrogation signals include a root-raised cosine waveform;
   (b) concurrently with (a), transmitting the interrogation signal within a retransmission frequency band separate from the interrogation frequency band from the beacon to a receiver which is positioned remotely from the beacon;
   (c) at the beacon, receiving and retransmitting by wireless communications to the receiver the response signal returned by the transponder, the retransmitted response signal from the beacon being transmitted within the retransmission frequency band; and
   (d) with the receiver, determining a time difference between the interrogation signal transmitted by the beacon in (b) and the response signal retransmitted by the beacon in (c), said time difference reflecting a signal propagation time between the beacon and the transponder.

13. The method as in claim 12, wherein the interrogation signal includes a linear ramp portion in which a frequency of the interrogation signal is ramped linearly over a period of time, and wherein (d) comprises the receiver measuring a time different between corresponding linear ramp portions included in the interrogation and response signals received from the beacon.

14. A method of determining the distance between a beacon and a transponder, comprising:
   (a) transmitting an interrogation signal including a root-raised cosine waveform by wireless communications from the beacon to the transponder within an interrogation frequency band of the transponder to cause the transponder to return a response signal, the response signal being a frequency-shifted version of the interrogation signal;
   (b) concurrently with (a), transmitting the interrogation signal from the beacon to a receiver which is positioned remotely from the beacon;
   (c) at the beacon, receiving and retransmitting by wireless communications to the receiver the response signal returned by the transponder; and
   (d) with the receiver, determining a time different between the root-raised cosine waveforms included in the interrogation signal transmitted by the beacon in (b) and the response signal retransmitted by the beacon in (c), said time different reflecting a signal propagation time between the beacon and the transponder.

15. The method as in claim 12, wherein (b) further comprises transmitting the interrogation signal from the beacon to the receiver at a higher transmission power than a transmission power used in (a) to transmit the interrogation signal.

16. The method as in claim 12, wherein (b) comprises transmitting the interrogation signal to the receiver over power lines of a building.

17. The method as in claim 12, further comprising the beacon determining a timing of the TDMA timeslot by monitoring a phase of an AC power signal on power lines of a building.

18. A transponder device adapted to be worn by a patient to permit the patient's location to be monitored, the transponder device comprising:
   a disposable wristband; and
   a transponder module which is adapted to be releasably attached to the disposable wristband, the transponder module including a transponder circuit that is responsive to a wireless interrogation signal received within a first frequency band by echoing the interrogation signal within a second frequency band, wherein the interrogation signal within the second frequency band is transmitted at a higher transmission power than the interrogation signal received with the first frequency band, further wherein the transponder module senses an identifier of the disposable wristband upon attachment to the wristband, the identifier used to determine the timing of the response of the transponder module to the interrogation signal.

19. The transponder device as in claim 18, wherein the disposable wristband includes a battery which powers the transponder module.

20. The transponder device as in claim 19, wherein the battery is a zinc air battery.

21. The transponder device as in claim 18, wherein the identifier is printed on a surface of the wristband in a conductive ink.

22. The transponder device as in claim 18, wherein the identifier is encoded within a passive electrical circuit of the disposable wristband.

23. The transponder device as in claim 18, wherein the transponder circuit uses a periodically transmitted synchronization sequence to determine when to echo interrogation signals.

24. The transponder device as in claim 18, wherein the transponder circuit echoes interrogation signals only during an assigned timeslot determined by the identifier of the disposable wristband.

25. The transponder device as in claim 24, wherein the timeslot is derived from a phase of an AC power signal.

26. The transponder device as in claim 18, wherein the transponder module is adapted to be sterilized between uses.

27. The transponder device as in claim 18, wherein the transponder circuit is responsive to interrogation signals in an ultrasonic band.

28. The transponder device as in claim 18, wherein the transponder circuit is responsive to interrogation signals in a radio frequency band.

29. A disposable wristband adapted for use in monitoring locations of patients, comprising:
   a base portion which houses a battery for providing power to a transponder module operable to generate a locating signal, the housing being configured to releasably receive the transponder module such that the transponder module may be removed from the base portion and reused following use by a patient;
   a wristband portion attached to the base portion for attachment to the wrist of a patient; and
   an identifier portion which embodies an identifier such that the identifier is readable by the transponder module when the transponder module is inserted within the base portion, wherein the operation of the transponder module to generate the locating signal is determined by the identifier, further wherein the transponder is configured to receive an interrogation signal including a root-raised cosine waveform from a beacon.

30. The disposable wristband as in claim 29, wherein the battery is a zinc air battery.

31. The disposable wristband as in claim 29, wherein the identifier is printed on a surface of the housing in conductive ink.

32. The disposable wristband as in claim 29, wherein the identifier is encoded within a passive circuit which is adapted to be measured by the transponder module.

33. The disposable wristband as in claim 29, in combination with a transponder module which is adapted to sense the identifier.

* * * * *